United States Patent
Kim

(10) Patent No.: US 8,107,567 B2
(45) Date of Patent: Jan. 31, 2012

(54) METHOD AND SYSTEM FOR SFBC/STBC IN A DIVERSITY TRANSMISSION SYSTEM USING ALAMOUTI CODES

(75) Inventor: Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 971 days.

(21) Appl. No.: 11/860,337

(22) Filed: Sep. 24, 2007

(65) Prior Publication Data

US 2008/0310541 A1  Dec. 18, 2008

Related U.S. Application Data

(60) Provisional application No. 60/944,647, filed on Jun. 18, 2007.

(51) Int. Cl.
 *H03D 1/04* (2006.01)
(52) U.S. Cl. ........ 375/346; 375/347; 375/348; 375/349; 375/260; 375/299
(58) Field of Classification Search .................. 375/346, 375/347, 348, 349, 260, 299
 See application file for complete search history.

(56) References Cited

U.S. PATENT DOCUMENTS

| | | | |
|---|---|---|---|
| 2003/0190897 A1* | 10/2003 | Lei et al. | 455/101 |
| 2005/0195912 A1* | 9/2005 | Kim et al. | 375/267 |
| 2006/0072683 A1* | 4/2006 | Kent et al. | 375/267 |
| 2008/0056305 A1* | 3/2008 | Medvedev et al. | 370/491 |
| 2008/0144737 A1* | 6/2008 | Naguib | 375/299 |

* cited by examiner

*Primary Examiner* — Kabir A Timory
(74) *Attorney, Agent, or Firm* — Garlick Harrison & Markison; Bruce E. Garlick

(57) ABSTRACT

Aspects of a system for SFBC and/or STBC in a diversity transmission system using a plurality of Alamouti codes may include a transmitting station that enables reception of signals via a wireless communication medium. The transmitting station may enable determination of a plurality of channel estimate values that are based on signal propagation characteristics of the wireless communication medium. A plurality of N weighting factor phase angles may be computed based on the plurality of channel estimate values, where N is an integer that is greater than 1. The transmitting station may enable transmission of a plurality of 2·N signals based on the plurality of N weighting factors. The plurality of 2·N signals may be encoded utilizing Alamouti coding.

28 Claims, 6 Drawing Sheets

METHOD AND SYSTEM FOR SFBC/STBC IN A DIVERSITY TRANSMISSION SYSTEM USING ALAMOUTI CODES

CROSS-REFERENCE TO RELATED APPLICATIONS/INCORPORATION BY REFERENCE

This application makes reference to, claims priority to, and claims the benefit of U.S. Provisional Application Ser. No. 60/944,647 filed Jun. 18, 2007.

The above stated application is hereby incorporated herein by reference in its entirety.

FIELD OF THE INVENTION

Certain embodiments of the invention relate to data communication. More specifically, certain embodiments of the invention relate to a method and system for SFBC/STBC in a diversity transmission system using Alamouti codes.

BACKGROUND OF THE INVENTION

Diversity transmission enables one or more streams of data to be transmitted via a plurality of transmitting antennas. Diversity transmission systems are described by the number of transmitting antennas and the number of receiving antennas. For example, a diversity transmission system, which utilizes four transmitting antennas to transmit signals and a single receiving antenna to receive signals, may be referred to as a 4×1 diversity transmission system.

Transmitted signal may be modified as they travel across a communication medium to the receiving station. This signal-modifying property of the communication medium may be referred to as fading. Each of the signals transmitted by each of the plurality of transmitting antennas may experience differing amounts of fading as the signals travel through the communication medium. This variable fading characteristic may be represented by a transfer function matrix, H, which comprises a plurality of transfer function coefficients, $h_{ji}$, that represent the differing fading characteristics experienced by the transmitted signals. Diversity transmission is a method for increasing the likelihood that a receiving station may receive the data transmitted by a transmitting station.

Each data stream may comprise a sequence of data symbols. Each data symbol comprises at least a portion of the data from the data stream. In a diversity transmission system, which utilizes orthogonal frequency division multiplexing (OFDM), each data symbol is referred to as an OFDM symbol. Each OFDM symbol may utilize a plurality of frequency carrier signals, wherein the frequencies of the carrier signals span the bandwidth of an RF channel. RF channel bandwidths may be determined, for example, based on applicable communication standards utilized in various communication systems. Exemplary RF channel bandwidths are 20 MHz and 40 MHz. One or more of the frequency carrier signals within an RF channel bandwidth may be utilized to transmit at least a portion of the data contained in the OFDM symbol. The size of each portion, as measured in bits for example, may be determined based on a constellation map. The constellation map may, in turn, be determined by a modulation type that is utilized to transport the data contained in the OFDM symbol via the RF channel.

In general, each of the data streams, which in turn comprise one or more OFDM symbols, may be referred to as a spatial stream. A diversity transmission system, which utilizes $N_{TX}$ transmitting antennas to transmit signals and $N_{RX}$ receiving antennas to receive signals, may be referred to as an $N_{TX} \times N_{RX}$ diversity transmission system.

In a diversity transmission system, each of the plurality of $N_{TX}$ transmitting antennas may transmit data symbols from a corresponding plurality of $N_{TX}$ space time streams. The $N_{TX}$ space time streams may be generated from a plurality of $N_{SS}$ spatial streams. Each of the data symbols in each space time stream may be referred to as a codeword. In a diversity transmission system, which utilizes space time block coding (STBC), at any given time instant, each of the plurality of $N_{TX}$ transmitting antennas may transmit a codeword, which comprises one of the OFDM symbols, or a permutated version of the OFDM symbol, from a selected one of the $N_{SS}$ spatial streams.

A variation of STBC is space frequency block coding (SFBC). In a diversity transmission system, which utilizes SFBC, each codeword may comprise a subset of the frequency carriers, or tones, and corresponding data portions, in an OFDM symbol. These subsets of frequency carriers may be referred to as tone groups.

Alamouti coding is a method utilized for coding signals in a diversity transmitting system that utilizes a plurality of transmitting antennas. Alamouti coding was designed to be utilized with diversity transmitting systems, which utilized two transmitting antennas. Alamouti coding may be utilized in connection with STBC or SFBC.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for SFBC/STBC in a diversity transmission system using Alamouti codes, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for SFBC/STBC in a diversity transmission system using Alamouti codes. Various embodiments of the invention may comprise a method and system for a diversity transmission system in which a plurality of $N_{AL}$ Alamouti codes may be utilized to encode signals for transmission via a plurality of $N_{TX}=2 \cdot N_{AL}$ transmitting antennas. An exemplary embodiment of the invention utilizes $N_{AL}=2$, which may enable diversity transmission utilizing $N_{TX}=4$ transmitting antennas.

Figure 1:
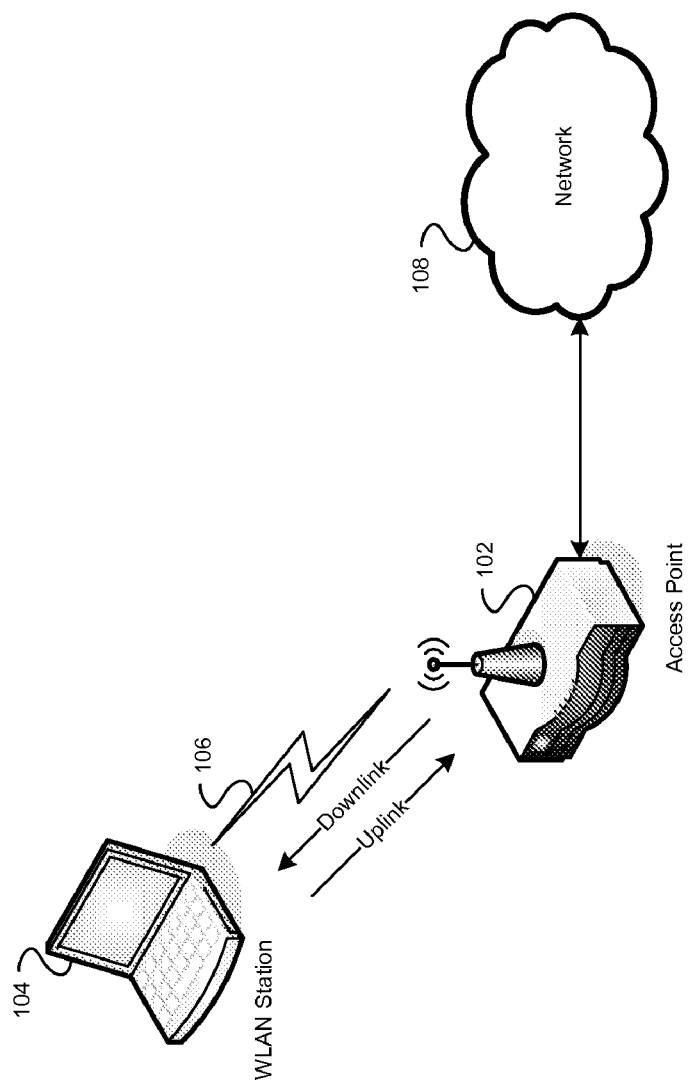
FIG. 1 is an exemplary wireless communication system, which may be utilized in connection with an embodiment of the invention.

FIG. 1 is an exemplary wireless communication system, which may be utilized in connection with an embodiment of the invention. Referring to FIG. 1, there is shown an access point (AP) 102, a wireless local area network (WLAN) station (STA) 104, and a network 108. The AP 102 and the STA 104 may communicate wirelessly via one or more radio frequency (RF) channels 106. The AP 102 and/or STA 104 utilize a plurality of transmitting antennas when transmitting signals, and the AP 102 and/or STA 104 may utilize one or more receiving antennas when receiving signals. The AP may be communicatively coupled to the network 108. The AP 102, STA 104 and network 108 may enable communication based on one or more IEEE 802 standards, for example IEEE 802.11.

The STA 104 may utilize the RF channel 106 to communicate with the AP 102 by transmitting signals via an uplink channel. The transmitted uplink channel signals may comprise one of more frequencies associated with a channel as determined by a relevant standard, such as IEEE 802.11. The STA 104 may utilize the RF channel 106 to receive signals from the AP 102 via a downlink channel. Similarly, the received downlink channel signals may comprise one of more frequencies associated with a channel as determined by a relevant standard, such as IEEE 802.11.

The STA 104 and AP 102 may communicate via time division duplex (TDD) communications and/or via frequency division duplex communications. With TDD communications, the STA 104 may utilize the RF channel 106 to communicate with the AP 102 at a current time instant while the AP 102 may communicate with the STA 104 via the RF channel 106 at a different time instant. With TDD communications, the set of frequencies utilized in the downlink channel may be substantially similar to the set of frequencies utilized in the uplink channel. With FDD communications, the STA 104 may utilize the RF channel 106 to communicate with the AP 102 at the same time instant at which the AP 102 utilizes the RF channel 106 to communicate with the STA 104. With FDD communications, the set of frequencies utilized in the downlink channel may be different from the set of frequencies utilized in the uplink channel.

Figure 2:
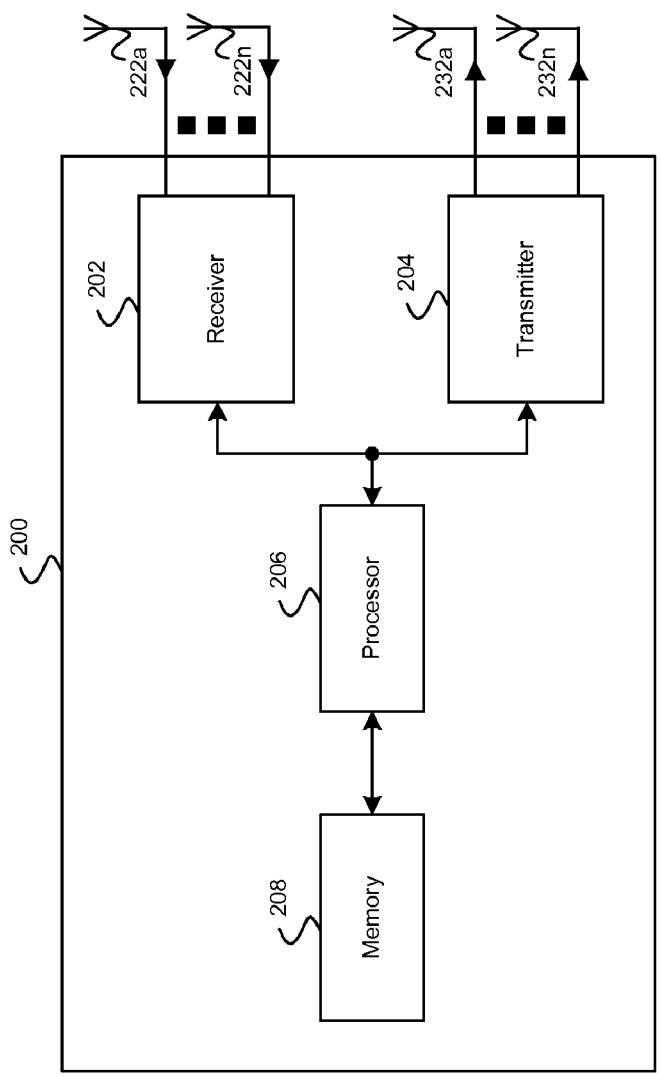
FIG. 2 is an exemplary transceiver comprising a plurality of transmitting antennas and a plurality of receiving antennas, which may be utilized in connection with an embodiment of the invention.

FIG. 2 is an exemplary transceiver comprising a plurality of transmitting antennas and a plurality of receiving antennas, which may be utilized in connection with an embodiment of the invention. Referring to FIG. 2, there is shown a transceiver system 200, a plurality of receiving antennas 222a . . . 222n and a plurality of transmitting antennas 232a . . . 232n. The transceiver system 200 may comprise at least a receiver 202, a transmitter 204, a processor 206, and a memory 208. Although a transceiver is shown in FIG. 2, transmit and receive functions may be separately implemented.

In accordance with an embodiment of the invention, the processor 206 may enable digital receiver and/or transmitter functions in accordance with applicable communications standards. The processor 206 may also perform various processing tasks on received data. The processing tasks may comprise computing channel estimates, which may characterize the wireless communication medium, delineating packet boundaries in received data, and computing packet error rate statistics indicative of the presence or absence of detected bit errors in received packets.

The receiver 202 may perform receiver functions that may comprise, but are not limited to, the amplification of received RF signals, generation of frequency carrier signals corresponding to selected RF channels, for example uplink channels, the down-conversion of the amplified RF signals by the generated frequency carrier signals, demodulation of data contained in data symbols based on application of a selected demodulation type, and detection of data contained in the demodulated signals. The RF signals may be received via one or more receiving antennas 222a . . . 222n. The data may be communicated to the processor 206.

The transmitter 204 may perform transmitter functions that may comprise, but are not limited to, modulation of received data to generated data symbols based on application of a selected modulation type, generation of frequency carrier signals corresponding to selected RF channels, for example downlink channels, the up-conversion of the data symbols by the generated frequency carrier signals, and the generation and amplification of RF signals. The data may be received from the processor 206. The RF signals may be transmitted via one or more transmitting antennas 232a . . . 232n.

The memory 208 may comprise suitable logic, circuitry and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM). In the context of the present application, the memory 208 may enable storage of code for the computation and storage of rotation angles based on channel feedback information, the computation and storage of complex-valued weighting factors, for example.

In various embodiments of the invention, the processor 206 may enable computation of a plurality of complex valued weighting factors. A phase angle for each weighting factor may be determined such that the phase a codeword transmitted from one antenna among a plurality of transmitting antennas, and received at a receiving antenna, is about equal to the phase of a scaled version of the codeword, which is concurrently transmitted from another antenna, and received at the receiving antenna. A scaled version of the codeword may be generated based on the codeword and a scale factor, which is selected from the group of weighting factors. For example, given a codeword, x[k], and a selected weighting factor, w[i], a scaled version of the codeword may be represented by w[i]·x[k].

In various embodiments of the invention utilized in a diversity transmission system, the processor 206 may enable computation of the plurality of weighting factors, w[0], w[1], . . . , w[$N_{AL}$−1]. In an exemplary embodiment of the invention, w[i]=$e^{j\cdot\theta_{w[i]}}$, where, $\theta_{w[i]}$, represents a phase angle. The processor 206 may also enable computation of corresponding phase angles for each of the weighting factors, $\theta_{w[0]}$, $\theta_{w[1]}$, . . . $\theta_{w[N_{AL}-1]}$. The processor 206 may enable configuration of the transmitter 204 to enable diversity transmission via a plurality of 2·$N_{AL}$ transmitting antennas 232a, . . . ,232n using a plurality of $N_{AL}$ Alamouti codes. The phase angles $\theta^{w[i]}$ may be computed by the processor 206 to enable the phase angle of a codeword transmitted by one of the transmitting antennas, and received at a receiving antenna, to be approximately equal to the phase of a scaled version of the codeword, which is concurrently transmitted by another one of the transmitting antennas and received at the receiving antenna.

Figure 3:
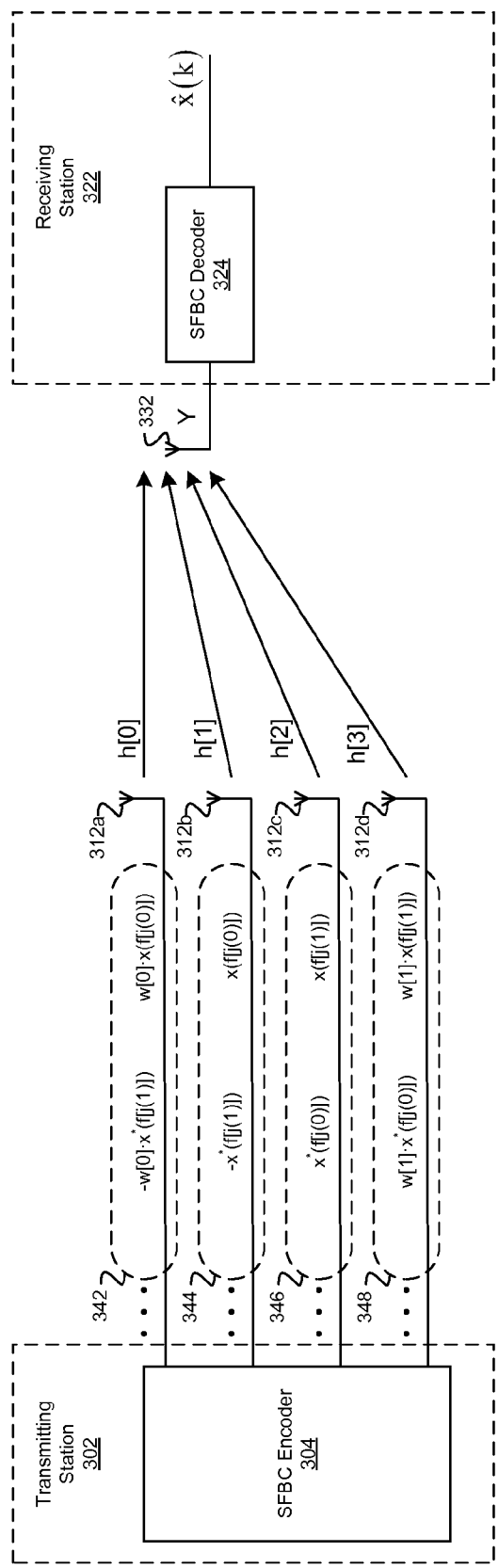
FIG. 3 is an exemplary block diagram of an SFBC diversity transmission system using Alamouti codes, in accordance with an embodiment of the invention.

FIG. 3 is an exemplary block diagram of an SFBC diversity transmission system using Alamouti codes, in accordance with an embodiment of the invention. Referring to FIG. 3, there is shown a transmitting station 302 and a receiving station 322. The transmitting station 302 may comprise an SFBC encoder 304. The SFBC encoder 304 may represent a component and/or function within a transmitter 204. The receiving station 322 may comprise an SFBC decoder 324. The SFBC decoder 324 may represent a component and/or function within a receiver 202. The transmitting station 302 may utilize diversity transmission by concurrently transmitting a plurality of RF output signals via at least a portion of the transmitting antennas 312a, 312b, 312c and 312d. The receiving station 322 may receive signals via the receiving antenna 332.

The SFBC encoder 304 may comprise suitable logic, circuitry and/or code that may enable the generation of codewords, which are output via a plurality of space time streams. The SFBC encoder 304 may receive OFDM symbols, which may be utilized to enable generation of the codewords. For example, an OFDM symbol, x, may be represented by codewords x(f[j(0)]) and x(f[j(1)]), where j(k) represents a set of indexes of frequency carriers within an RF bandwidth that are associated with a tone group k; f[j(k)] represents the frequency of a frequency carrier associated with each corresponding frequency carrier index value j(k); and x(f[j(k)]) represents the portion of data contained within the OFDM symbol, which is associated with each frequency carrier f[j(k)]. In an exemplary embodiment of the invention, the set of index values j(0) and j(1) within each tone group are as shown below:

$$j(0) = 0, 2, 4, \ldots, \left(\left\lceil \frac{N_{fc}}{2} \right\rceil - 1\right) \cdot 2; \text{ and} \quad [1]$$

$$j(1) = 1, 3, 5, \ldots, \left(\left\lceil \frac{N_{fc}}{2} \right\rceil - 1\right) \cdot 2 + 1$$

where $N_{fc}$ refers to the number of frequency carriers within an RF channel bandwidth.

In an exemplary embodiment of the invention, the transmitting station 302 may utilize four transmitting antennas, 312a, 312b, 312c and 312d, for transmitting signals to the receiving station 322. The transmitting station 302 may utilize two Alamouti codes when transmitting signals via the four transmitting antennas. The transmitting station 302 may generate a two sets of Alamouti encoded signals transmitted by the four transmitting antennas by multiplying a first codeword, x(f[j(0)]), by a first complex-valued weighting factor, w[0] to generate a first scaled codeword, w[0]·x(f[j(0)]). In an exemplary embodiment of the invention, the first scaled codeword may be represented as $x(f[j(0)]) \cdot e^{j \cdot \Theta_w[0]}$. The transmitting station 302 may multiply a second codeword, x(f[j(1)]), by a second complex-valued weighting factor, w[1], to generate a second scaled codeword, w[1]·x(f[j(1)]). In an exemplary embodiment of the invention, the second scaled codeword may be represented as $x(f[j(1)]) \cdot e^{j \cdot \Theta_w[1]}$. The transmitting station 302 may multiply a complex-conjugate transformed version of the second codeword, x*(f[j(1)]), by the first weighting factor, w[0], to generate a third scaled codeword, −w[0]·x*(f[j(1)]). In an exemplary embodiment of the invention, the third scaled codeword may be represented as $-x^*(f[j(1)]) \cdot e^{j \cdot \Theta_w[0]}$. The transmitting station 302 may multiply a complex-conjugate transformed version of the first codeword, x*(f[j(0)]), by the second weighting factor, w[1], to generate a fourth scaled codeword, w[1]·x*(f[j(0)]). In an exemplary embodiment of the invention, the fourth scaled codeword may be represented as $x^*(f[j(0)]) \cdot e^{j \cdot \Theta_w[1]}$.

As shown in FIG. 3, the first set of Alamouti codes may comprise concurrently transmitting the first scaled codeword, w[0]·x(f[j(0)]), from the transmitting antenna 312a and the first codeword, x(f[j(0)]), from the transmitting antenna 312b. In addition, the third scaled codeword, −w[0]·x*(f[j(1)]), may be transmitted from the first transmitting antenna and a codeword based on a complex-conjugate transformed version of the second codeword, −x*(f[j(1)]), may be concurrently transmitted from the second transmitting antenna.

The second set of Alamouti codes may comprise concurrently transmitting the second codeword, x(f[j(1)]), from the transmitting antenna 312c and the second scaled codeword, w[1]·x(f[j(1)]), from the transmitting antenna 312d. In addition, a complex-conjugate transformed version of the first codeword, x*(f[j(0)]), may be transmitted from the transmitting antenna 312c and the fourth scaled codeword, −w₁·x*(f[j(0)]), may be concurrently transmitted from the transmitting antenna 312d.

Signals transmitted from the transmitting antennas 312a, 312b, 312c and 312d travel through a wireless communication medium and may be received at the receiving antenna 332. Signals traveling from the transmitting antenna 312a and received at the receiving antenna 332 may be modified based on the channel estimate value h[0]; signals traveling from the transmitting antenna 312b and received at the receiving antenna 332 may be modified based on the channel estimate value h[1]; signals traveling from the transmitting antenna 312c and received at the receiving antenna 332 may be modified based on the channel estimate value h[2]; and signals traveling from the transmitting antenna 312d and received at the receiving antenna 332 may be modified based on the channel estimate value h[3].

The signals received at the SFBC decoder 324, Y, may be represented as in the following equation:

$$\begin{bmatrix} y(f[j(0)]) \\ y^*(f[j(1)]) \end{bmatrix} = \begin{bmatrix} w[0] \cdot h[0] + h[1] & h[2] + w[1] \cdot h[3] \\ h^*[2] + w^*[1] \cdot h^*[3] & -w^*[0] \cdot h^*[0] - h^*[1] \end{bmatrix} \begin{bmatrix} x(f[j(0)]) \\ x(f[j(1)]) \end{bmatrix} + \begin{bmatrix} n_0 \\ n_1 \end{bmatrix} \quad [2]$$

where Y is a signal vector represented by individual signals y(f[j(k)]). Equation [2] may be represented as follows:

$$\begin{bmatrix} y(f[j(0)]) \\ y^*(f[j(1)]) \end{bmatrix} = H \times \begin{bmatrix} x(f[j(0)]) \\ x(f[j(1)]) \end{bmatrix} + \begin{bmatrix} n_0 \\ n_1 \end{bmatrix} \quad [3]$$

where $n_0$ and $n_1$ represent signal noise.

The SFBC decoder 324 may comprise suitable logic, circuitry and/or code that may enable reception of the signal vector Y. The signal vector Y may be decoded to enable generation of estimated values for the codewords as represented by $\hat{x}(f[j(0)])$ and $\hat{x}(f[j(1)])$. In various embodiments of the invention, the SFBC decoder 324 may generate a square matrix to enable decoding of the signal vector Y. The square matrix may be derived by pre-multiplying the left and right hand sides of equation [3] by $H^H$, where $H^H$ represents a Hermitian (or complex conjugate transpose version) of H. The square matrix, $H_{sq}$, may be represented as shown in the following equation:

$$H_{sq} = H^H \times H$$

$$= \begin{bmatrix} |w[0] \cdot h[0] + h[1]|^2 + |h[2] + w[1] \cdot h[3]|^2 & 0 \\ 0 & |w[0] \cdot h[0] + h[1]|^2 + |h[2] + w[1] \cdot h[3]|^2 \end{bmatrix} \quad [4]$$

where the value of the diagonal elements, $|w[0] \cdot h[0]+h[1]|^2+|h[2]+w[1] \cdot h[3]|^2$, may be maximized under the following conditions:

$$\theta_{w[0]} = \theta_{h[1]} - \theta_{h[0]}; \text{ and}$$

$$\theta_{w[1]} = \theta_{h[3]} - \theta_{h[2]} \quad [5]$$

where $\theta_x$ represents the phase angle of x. The conditions shown in equation [5] may be referred to as co-phase conditions. In an exemplary embodiment of the invention, in which $|w[i]|=1$ (where i is an index for each of the weighting factors), when the co-phase condition of equation [5] is met, equation [4] may be represented as follows:

$$H_{sq} = \begin{bmatrix} \|h[0]\| + |h[1]\|^2 + \|h[2]\| + |h[3]\|^2 & 0 \\ 0 & \|h[0]\| + |h[1]\|^2 + \|h[2]\| + |h[3]\|^2 \end{bmatrix} \quad [6]$$

In various embodiments of the invention, the phase angle, $\theta_{w[i]}$, for each of the weighting factors w[i] may be independently determined based on the phase angle(s), $\theta_{h[m]}$, of one or more of the channel estimate values h[m].

Figure 4:
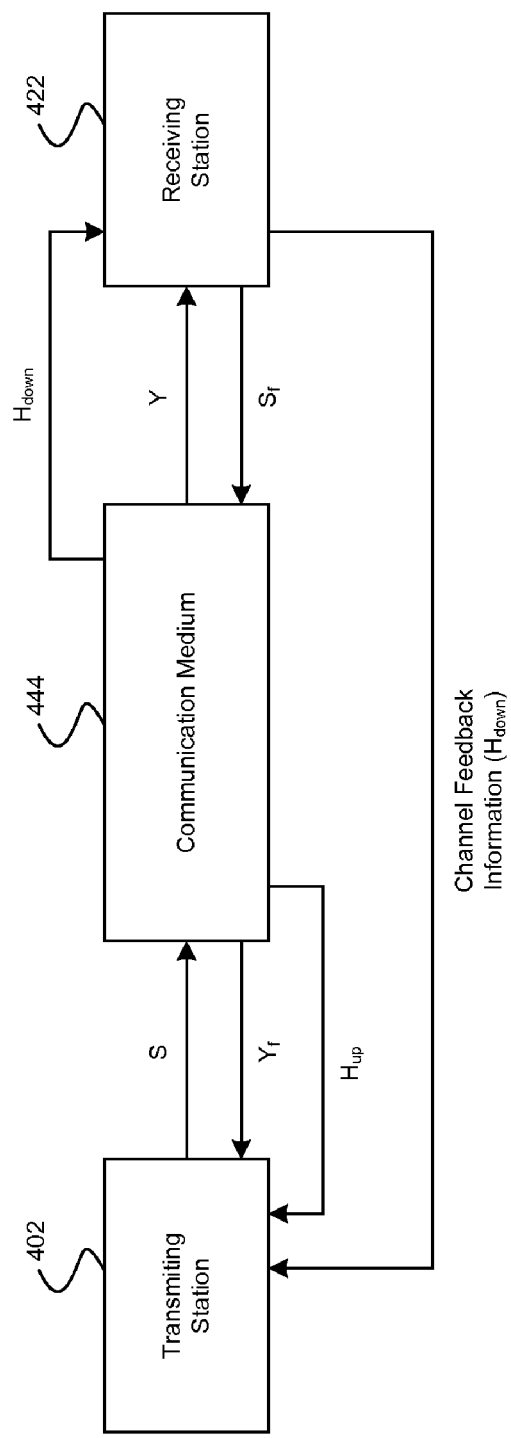
FIG. 4 is an exemplary diagram illustrating channel feedback, which may be utilized in connection with an embodiment of the invention.

FIG. 4 is an exemplary diagram illustrating channel feedback, which may be utilized in connection with an embodiment of the invention. Referring to FIG. 4, there is shown a transmitting station 402, a receiving station 422, and a communications medium 444. The communications medium 444 may represent a wireless communications medium. The transmitting station 402 may represent an AP 102 and the receiving station may represent an STA 104, for example. The transmitting station 402 may transmit a signal vector S to the receiving station 422 via the communications medium 444. The communications direction from the transmitting station 402 to the receiving station 422 may be referred to as a downlink direction. The signal vector S may comprise a plurality of signals, which are concurrently transmitted via one or more transmitting antennas that are located at the transmitting station 402. The transmitted signals, which are represented in the signal vector S, may travel through the communications medium 444. The transmitted signals may be altered while traveling through the communications medium 444. The transmission characteristics associated with the communications medium 444 may be characterized by the transfer function matrix, H. The transmitted signals, which are represented by the signal vector S, may be altered based on the transfer function matrix H. In the downlink direction, the transfer function matrix H may be referred to as $H_{down}$. The signals received at the receiving station 422 may be represented by the signal vector, Y. The signal vector Y may be generated based on the signal vector S and the transfer function matrix H as shown in the following equation:

$$Y = H_{down} \times S \quad [7]$$

The coefficients, which are the matrix elements within the transfer function matrix H, may comprise channel estimate values, h[m]. The channel estimate values may be computed based on at least a portion of the received signals represented by the signal vector Y. In an exemplary embodiment of the invention, the channel estimate values may be computed based on the portion(s) of the signals, transmitted by the transmitting station 402, which carry preamble data.

Each of the computed channel estimate values h[m] may be represented by a magnitude value, |h[m]|, and a phase angle value $\theta_{h[m]}$. The receiving station may utilize the computed phase angle values to compute weighting factor phase angles, $\theta_{w[i]}$, that meet the co-phase condition as shown in equation [5]. The receiving station 422 may utilize the computed channel estimate values, h[m], and the computed weighting factor phase angles $\theta_{h[m]}$ to compute a transfer function matrix, H, as shown in equation [3]. The computed transfer function matrix, H, may also be represented $H=H_{down}$. The receiving station 422 may also compute a square matrix, $H_{sq}$, as shown in equation [6], which enables the receiving station 422 to compute estimated values for the codewords $\hat{x}(f[j(k)])$.

The receiving station 422 may communicate the computed transfer function matrix $H_{down}$ to the transmitting station 402 as channel feedback information, for example. The receiving station 422 may communicate the channel feedback information ($H_{down}$) via one or more signals, which are represented by the transmitted signal vector $S_f$. The signals represented by the transmitted signal vector $S_f$ may be transmitted to the transmitting station 402 via the communications medium 444. The signals represented by the signal vector $S_f$ may be altered while traveling through the communications medium 444. The communications direction from the receiving station 422 to the transmitting station 402 may be referred to as an uplink direction. In the uplink direction the transfer function matrix may be referred to as $H_{up}$. The signals received at the transmitting station 402 may be represented by the signal vector, $Y_f$. The signal vector $Y_f$ may be generated based on the signal vector $S_f$ and the transfer function matrix $H_{up}$ as shown in the following equation:

$$Y_f = H_{down} \times S_f \quad [3]$$

In either an FDD or TDD communication system, the transmitting station 402 may utilize the transfer function matrix, $H_{down}$, received in the channel feedback information to compute weighting factor phase angles $\theta_{w[i]}$. The transmitting station 402 may utilize the received transfer function matrix, $H_{down}$, and the computed weighting factor phase angles, $\theta_{w[i]}$, to compute subsequent Alamouti codes. The subsequent computed Alamouti codes may enable the transmitting station 402 to generate subsequent transmitted signals represented by the signal vector S.

In a TDD communication system the transmitting station 402 may utilize preamble data contained within the received signal vector, $Y_f$, to compute the transfer function matrix, $H_{up}$. Based on the channel estimate values, h[m], in the computed transfer function matrix, $H_{up}$, the transmitting station 402 may compute weighting factor phase angles, $\theta_{w[i]}$, in accordance with the co-phase condition as shown in equation [5]. The computed weighting factor phase angles may enable the computation of subsequent Alamouti codes. The subsequent Alamouti codes, computed based on the channel estimate values within the computed transfer function matrix $H_{up}$, may be utilized to enable the transmitting station 402 to generate subsequent transmitted signals represented by the signal vector S.

Figure 5:
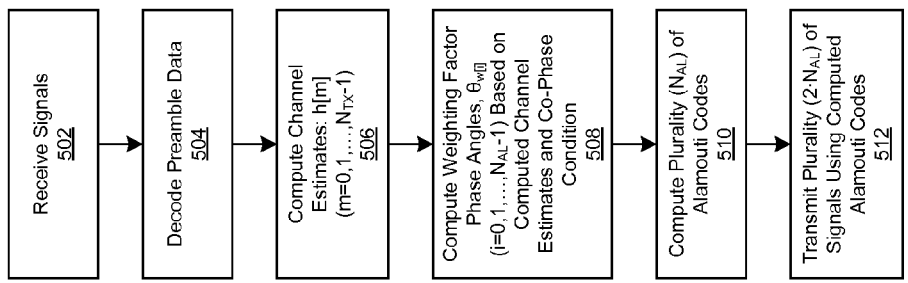
FIG. 5 is a flowchart illustrating exemplary steps for generating a plurality of Alamouti codes in a diversity transmission system, in accordance with an embodiment of the invention.

FIG. 5 is a flowchart illustrating exemplary steps for generating a plurality of Alamouti codes in a diversity transmission system, in accordance with an embodiment of the invention. In various embodiments of the invention, the flowchart shown in FIG. 5 may be adapted for use when an AP 102 is transmitting signals to a STA 104 in the downlink direction, or when the STA 104 is transmitting signals to the AP 102 in the uplink direction. Referring to FIG. 5, in step 502, a transmitting station 402 may receive signals represented by the signal vector $Y_f$ (FIG. 4). In step 504, the transmitting station 402 may decode preamble data contained in the received signals. In step 506, the transmitting station 402 may compute channel estimate values, h[m] based on the received preamble data. In step 508, the transmitting station 402 may compute weighting factor phase angles, $\theta_{w[i]}$ (where i=0,1, . . . , $N_{AL}$-1), based on the computed channel estimate values, h[m] and on the co-phase condition shown in equation [5]. In step 510, the transmitting station 402 may compute $N_{AL}$ Alamouti codes. In step 512, the transmitting station 402 may utilize the computed Alamouti codes to transmit $2 \cdot N_{AL}$ signals.

Figure 6:
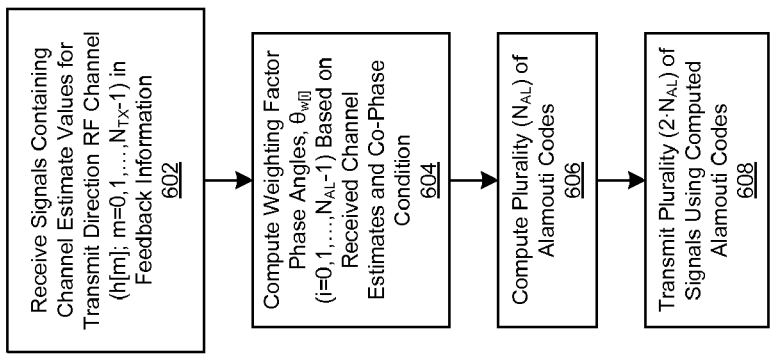
FIG. 6 is a flowchart illustrating exemplary steps for generating a plurality of Alamouti codes in a diversity transmission system using feedback information, in accordance with an embodiment of the invention.

FIG. 6 is a flowchart illustrating exemplary steps for generating a plurality of Alamouti codes in a diversity transmission system using feedback information, in accordance with an embodiment of the invention. In various embodiments of the invention, the flowchart shown in FIG. 6 may be adapted for use when an AP 102 is transmitting signals to a STA 104 in the downlink direction, or when the STA 104 is transmitting signals to the AP 102 in the uplink direction. Referring to FIG. 6, in step 602, a transmitting station 402 may receive signals represented by the signal vector $Y_f$ (FIG. 4). The signals represented by the received signal vector, $Y_f$, may comprise channel estimate values h[m], which characterize the communication medium 444 in the transmit direction. In step 604, the transmitting station 402 may compute weighting factor phase angles, $\theta_{w[i]}$ (where i=0, 1, . . . , $N_{AL}$-1), based on the received channel estimate values h[m] and on the co-phase condition shown in equation [5]. In step 606, the transmitting station 402 may compute $N_{AL}$ Alamouti codes. In step 608, the transmitting station 402 may utilize the computed Alamouti codes to transmit $2 \cdot N_{AL}$ signals.

Various embodiments of invention as described above may also be practiced in an STBC communication system.

Aspects of a system for SFBC and/or STBC in a diversity transmission system using a plurality of Alamouti codes may include a transmitting station 402 that enables reception of signals via a wireless communication medium 444. The transmitting station 402 may enable determination of a plurality of channel estimate values that are based on signal propagation characteristics of the wireless communication medium 444. A plurality of N weighting factor phase angles may be computed based on the plurality of channel estimate values. The transmitting station 402 may enable transmission of a plurality of $2 \cdot N$ signals based on the plurality of N weighting factors. The plurality of $2 \cdot N$ signals may be encoded utilizing Alamouti coding.

A channel estimate phase angle may be determined for each of the plurality of channel estimate values. The transmitting station 402 may enable computation of a selected one of the plurality of N weighting factor phase angles based on a first selected channel estimate phase angle and a second selected channel estimate phase angle. A first scaled codeword may be computed based on the selected computed one of the plurality of N weighting factor phase angles and a first codeword. A second scaled codeword may be computed based on the selected computed one of the plurality of N weighting factor phase angles and a second codeword. The transmitting station 402 may enable generation of a first codeword group based on the first scaled codeword and the first codeword. A second codeword group may be generated based on the second scaled codeword and the second codeword. The transmitting station 402 may enable generation of a first Alamouti code by transmitting the first codeword group, and the second codeword group.

The transmitting station 402 may enable computation of a selected subsequent one of the plurality of N weighting factor phase angles based on a third selected channel estimate phase angle and a fourth selected channel estimate phase angle. A third scaled codeword may be computed based on the selected subsequent computed one of the plurality of N weighting factor phase angles and a second codeword. A fourth scaled codeword may be computed based on the selected subsequent computed one of the plurality of N weighting factor phase angles and a first codeword. The transmitting station 402 may enable generation of a third codeword group based on the third scaled codeword and the second codeword. A fourth codeword group may be generated based on the fourth scaled codeword and the first codeword. The transmitting station 402 may enable generation of a second Alamouti code may by transmitting the third codeword group, and the fourth codeword group. The transmitting station 402 may enable concurrent transmission of the third codeword group and the first codeword group. The transmitting station 402 may also enable concurrent transmission of the fourth codeword group and the second codeword group.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Aspects of a machine-readable storage having stored thereon, a computer program having at least one code section for processing signals in a communication system, the at least one code section being executable by a machine for causing the machine to perform steps for SFBC and/or STBC in a diversity transmission system using a plurality of Alamouti codes.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
    receiving signals via a wireless communication medium;
    determining a plurality of channel estimate values that are based on signal propagation characteristics of said wireless communication medium;
    determining a channel estimate phase angle for each of said plurality of channel estimate values;
    computing a plurality of N weighting factor phase angles based on said plurality of channel estimate values;
    computing a selected one of said plurality of N weighting factor phase angles based on a first selected said channel estimate phase angle and a second selected said channel estimate phase angle; and
    transmitting a plurality of 2·N signals based on said plurality of N weighting factor phase angles.

2. The method according to claim 1, comprising encoding said transmitted plurality of 2·N signals utilizing Alamouti coding.

3. The method according to claim 1, comprising computing a first scaled codeword based on said selected said computed one of said plurality of N weighting factor phase angles and a first codeword, and a second scaled codeword based on said selected said computed one of said plurality of N weighting factor phase angles and a second codeword.

4. The method according to claim 3, comprising generating a first codeword group based on said first scaled codeword and said first codeword, and a second codeword group based on said second scaled codeword and said second codeword.

5. The method according to claim 4, comprising generating a first Alamouti code by transmitting said first codeword group and said second codeword group.

6. The method according to claim 1, comprising computing a selected subsequent one of said plurality of N weighting factor phase angles based on a third selected said channel estimate phase angle and a fourth selected said channel estimate phase angle.

7. The method according to claim 6, comprising computing a third scaled codeword based on said selected said computed subsequent one of said plurality of N weighting factor phase angles and a second codeword, and computing a fourth scaled codeword based on said selected said computed subsequent one of said plurality of N weighting factor phase angles and a first codeword.

8. The method according to claim 7, comprising generating a third codeword group based on said third scaled codeword and said second codeword, and a fourth codeword group based on said fourth scaled codeword and said first codeword.

9. The method according to claim 8, comprising generating a second Alamouti code by transmitting said third codeword group and said fourth codeword group.

10. The method according to claim 8, comprising concurrently transmitting one or both of: said third codeword group and a first codeword group, and said fourth codeword group and a second codeword group.

11. A system for processing signals in a communication system, the system comprising:
    one or more circuits that enable reception of signals via a wireless communication medium;
    said one or more circuits enable determination of a plurality of channel estimate values that are based on signal propagation characteristics of said wireless communication medium;
    said one or more circuits enable determination of a channel estimate phase angle for each of said plurality of channel estimate values;
    said one or more circuits enable computation of a plurality of N weighting factor phase angles based on said plurality of channel estimate values;
    said one or more circuits enable computation of a selected one of said plurality of N weighting factor phase angles based on a first selected said channel estimate phase angle and a second selected said channel estimate phase angle; and
    said one or more circuits enable transmission of a plurality of 2·N signals based on said plurality of N weighting factor phase angles.

12. The system according to claim 11, wherein said one or more circuits enable encoding of said transmitted plurality of 2·N signals utilizing Alamouti coding.

13. The system according to claim 11, wherein said one or more circuits enable computation of a first scaled codeword based on said selected said computed one of said plurality of N weighting factor phase angles and a first codeword, and a second scaled codeword based on said selected said computed one of said plurality of N weighting factor phase angles and a second codeword.

14. The system according to claim 13, wherein said one or more circuits enable generation of a first codeword group based on said first scaled codeword and said first codeword, and a second codeword group based on said second scaled codeword and said second codeword.

15. The system according to claim 14, wherein said one or more circuits enable generation of a first Alamouti code by transmitting said first codeword group and said second codeword group.

16. The system according to claim 11, wherein said one or more circuits enable computation of a selected subsequent one of said plurality of N weighting factor phase angles based on a third selected said channel estimate phase angle and a fourth selected said channel estimate phase angle.

17. The system according to claim 16, wherein said one or more circuits enable computation of a third scaled codeword based on said selected said computed subsequent one of said plurality of N weighting factor phase angles and a second codeword, and a fourth scaled codeword based on said selected said computed subsequent one of said plurality of N weighting factor phase angles and a first codeword.

18. The system according to claim 17, wherein said one or more circuits enable generation of a third codeword group based on said third scaled codeword and said second codeword, and a fourth codeword group based on said fourth scaled codeword and said first codeword.

19. The system according to claim 18, wherein said one or more circuits enable generation of a second Alamouti code by transmitting said third codeword group and said fourth codeword group.

20. The system according to claim 18, wherein one or more circuits enable concurrent transmission of one or both of: said third codeword group and a first codeword group, and said fourth codeword group and a second codeword group.

21. A method for processing signals in a communication system, the method comprising:
- receiving signals via a wireless communication medium;
- determining a plurality of channel estimate values that are based on signal propagation characteristics of said wireless communication medium;
- determining a plurality of channel estimate phase angle values corresponding to said plurality of channel estimate values;
- computing a weighting factor phase angle value for each of a plurality of weighting factor values based on a portion of said plurality of channel estimate phase angle values that correspond to a distinct portion of said plurality of channel estimate values;
- computing said plurality of weighting factor values based on said plurality of weighting factor phase angle values;
- concurrently transmitting a plurality of signals based on said plurality of weighting factor values, wherein a number of said plurality of signals is equal to 2 times a number of said plurality of weighting factor values.

22. The method according to claim 21, comprising computing said weighting factor phase angle value based on a subtractive difference value among said portion of said plurality of channel estimate phase angle values.

23. The method according to claim 21, comprising computing said plurality of channel estimate values based on said received signals.

24. The method according to claim 21, comprising computing said plurality of channel estimate values based on feedback information that is received via said received signals.

25. A system for processing signals in a communication system, the system comprising:
- one or more circuits that enable reception of signals via a wireless communication medium;
- said one or more circuits enable determination of a plurality of channel estimate values that are based on signal propagation characteristics of said wireless communication medium;
- said one or more circuits enable determination of a plurality of channel estimate phase angle values corresponding to said plurality of channel estimate values;
- said one or more circuits enable computation of a weighting factor phase angle value for each of a plurality of weighting factor values based on a portion of said plurality of channel estimate phase angle values that correspond to a distinct portion of said plurality of channel estimate values;
- said one or more circuits enable computation of said plurality of weighting factor values based on said plurality of weighting factor phase angle values;
- said one or more circuits enable concurrent transmission of a plurality of signals based on said plurality of weighting factor values, wherein a number of said plurality of signals is equal to 2 times a number of said plurality of weighting factor values.

26. The system according to claim 25, wherein said one or more circuits enable computation of said weighting factor phase angle value based on a subtractive difference value among said portion of said plurality of channel estimate phase angle values.

27. The system according to claim 25, wherein said one or more circuits enable computation of said plurality of channel estimate values based on said received signals.

28. The system according to claim 25, wherein said one or more circuits enable computation of said plurality of channel estimate values based on feedback information that is received via said received signals.

* * * * *